United States Patent [19]
Grudzien, Jr.

[11] Patent Number: 5,319,978
[45] Date of Patent: * Jun. 14, 1994

[54] OPTICAL PRESSURE TRANSDUCER

[75] Inventor: Christopher P. Grudzien, Jr., Mansfield, Mass.

[73] Assignee: Dynisco, Inc., Sharon, Mass.

[*] Notice: The portion of the term of this patent subsequent to Jul. 7, 2009 has been disclaimed.

[21] Appl. No.: 907,331

[22] Filed: Jul. 1, 1992

Related U.S. Application Data

[63] Continuation-in-part of Ser. No. 517,827, May 2, 1990, Pat. No. 5,127,269.

[51] Int. Cl.$^5$ .................................................. G01L 11/00
[52] U.S. Cl. .................................. 73/705; 250/231.19
[58] Field of Search ...................... 73/705, 715, 723; 250/205, 231.19

[56] References Cited

U.S. PATENT DOCUMENTS

| | | |
|---|---|---|
| Re. 31,832 | 2/1985 | Samulski . |
| 3,100,997 | 8/1963 | Lorenz ............................ 250/231.19 |
| 3,249,760 | 5/1966 | Miller ................................ 250/231.1 |
| 3,291,995 | 12/1966 | Schalkowsky ................. 250/231.19 |
| 4,071,753 | 1/1978 | Fulenwita et al. . |
| 4,075,058 | 2/1978 | Noyes . |
| 4,075,493 | 2/1978 | Wickersheim . |
| 4,218,925 | 8/1980 | DiDomizio, Jr. . |
| 4,275,295 | 6/1981 | Menningen et al. . |
| 4,313,344 | 2/1982 | Brogardh et al. . |
| 4,329,577 | 5/1982 | Asano et al. . |
| 4,329,877 | 5/1982 | Hershey . |
| 4,376,890 | 3/1983 | Engstrom et al. . |
| 4,477,724 | 10/1984 | Harmer . |
| 4,482,805 | 11/1984 | Palmer . |
| 4,490,606 | 12/1984 | Lochett et al. . |
| 4,493,995 | 1/1985 | Adolfsson et al. . |
| 4,498,004 | 2/1985 | Adolfsson et al. . |
| 4,539,850 | 9/1985 | Ziegler . |
| 4,589,286 | 5/1986 | Berthold, III . |
| 4,600,836 | 7/1986 | Berthold, III . |
| 4,620,093 | 10/1986 | Barkhoudarian et al. ............ 73/705 |
| 4,665,747 | 5/1987 | Muscatell . |
| 4,687,927 | 8/1987 | Iwamoto et al. . |
| 4,727,730 | 3/1988 | Boiarski et al. ....................... 73/705 |
| 4,805,630 | 7/1989 | Storey .................................... 73/705 |
| 4,942,766 | 7/1990 | Greenwood et al. ................. 73/705 |
| 5,065,010 | 11/1991 | Knute ............................ 250/231.19 |
| 5,127,269 | 7/1992 | Grudzien, Jr. ......................... 73/705 |

FOREIGN PATENT DOCUMENTS

| | | |
|---|---|---|
| 0184721A2 | 6/1986 | European Pat. Off. . |
| WO85/04473 | 4/1985 | PCT Int'l Appl. . |
| WO85/05697 | 5/1985 | PCT Int'l Appl. . |
| 2215840A | 9/1989 | United Kingdom . |

OTHER PUBLICATIONS

Navy Technical Disclosure Bulletin, Theodore Y. Wu, Jul. 1979, vol. 4, No. 7, pp. 9–12.

*Primary Examiner*—Donald O. Woodiel
*Assistant Examiner*—William L. Oen
*Attorney, Agent, or Firm*—Wolf, Greenfield & Sacks

[57] ABSTRACT

An optical pressure transducer includes a body for supporting therein both an input optical fiber and an output optical fiber. A light source generates input light to the input optical fiber. A force responsive diaphragm is secured to the body and deflects in response to sensed pressure. A fixed reflector and a moveable reflector, which is attached to and moves with the diaphragm, are disposed in the optical path between the input and output optical fibers and reflect at least a portion of the input light from the input optical fiber to the output optical fiber. The amount of light reflected depends upon the deflection of the diaphragm. A system for monitoring and controlling the light source, including an optical detector in a feedback arrangement, is provided such that the amount of light generated by the light source remains constant and maximized.

56 Claims, 13 Drawing Sheets

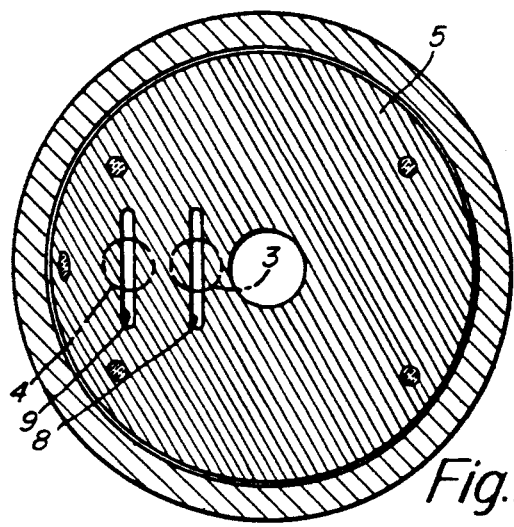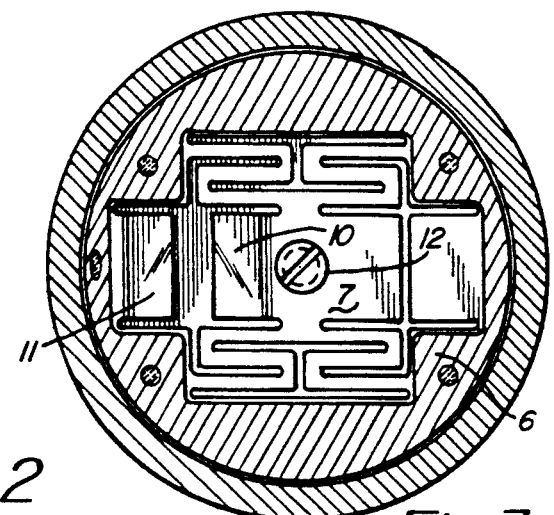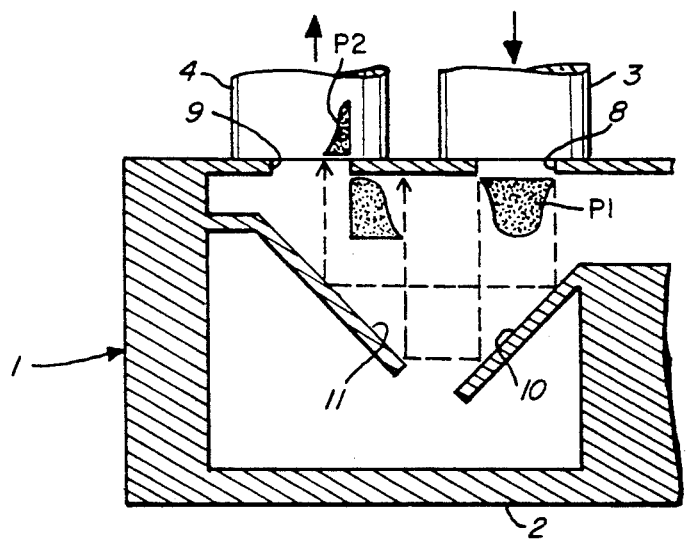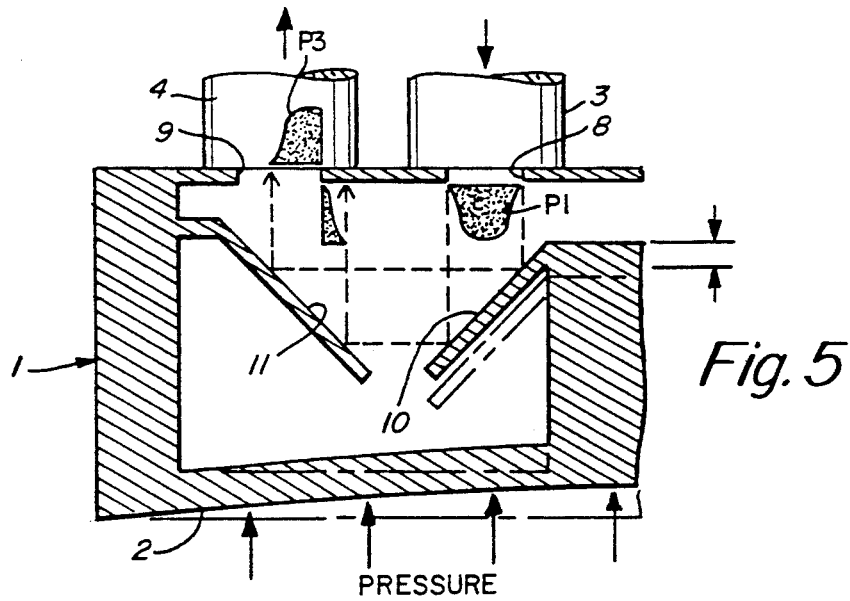

PRESSURE

PRESSURE

OPTICAL PRESSURE TRANSDUCER

RELATED APPLICATION

The present application is a continuation in-part application of application Ser. No. 07/517,827 filed May 2, 1990 and now U.S. Pat. No. 5,127,269.

BACKGROUND OF THE INVENTION

1. Field of the Invention

The present invention relates in general to pressure transducers and pertains, more particularly, to a pressure transducer that is adapted to sense pressure by optical means.

2. Background Discussion

The assignee of the present application presently manufacturers and sells melt pressure transducers that are covered by one or more of the following U.S. patents:

| U.S. Pat. No. | Issued |
| --- | --- |
| 3,349,623 | October 31, 1967 |
| 3,678,753 | July 25, 1972 |
| 4,680,972 | July 21, 1987 |
| 4,679,438 | July 14, 1987 |
| 4,702,113 | October 27, 1987 |
| 4,712,430 | December 15, 1987 |
| 4,829,827 | May 16, 1989 |
| 4,819,487 | April 11, 1989 |
| 4,858,471 | August 22, 1989 |

For the most part, these pressure transducer constructions use a liquid metal filled capillary system. A typical fill material is mercury. For some applications, particularly where toxicity could be critical, mercury filled pressure transducers may be considered somewhat unsafe in operation.

Accordingly, it is an object of the present invention to provide an alternate pressure sensor construction which eliminates the need for a liquid metal filled capillary system and which is yet able to operate in harsh, high temperature/pressure working environments.

Another object of the present invention is to provide an optical pressure transducer which permits signal conditioning electronics to be disposed remote to the working environment without loss of signal integrity.

A further object of the present invention is to provide an improved optical pressure transducer that can be constructed in relatively small size, particularly adapted for essential retrofit in a standard melt pressure transducer framework.

An even further object of the present invention is to provide an improved optical pressure transducer having a constant maximized input light source.

An even further object of the present invention is to provide an improved optical pressure transducer having a system for monitoring and controlling the light source such that the input light remains constant.

SUMMARY OF THE INVENTION

To accomplish the foregoing and other objects, features and advantages of the invention, there is provided an optical pressure transducer which includes a body for supporting therein both an input optical fiber and an output optical fiber. The pressure transducer also comprises a light source for generating input light to the input optical fiber. A force responsive diaphragm is secured to the body and deflects in response to sensed pressure. A pair of reflectors are disposed in the optical path between the input and output optical fibers and reflect at least a portion of the input light from the input optical fiber to the output optical fiber. The amount of light reflected depends upon the deflection of the diaphragm. The transducer further includes a system for monitoring and controlling the light source such that the amount of light generated by the light source remains constant.

In a preferred embodiment of the present invention, this system for monitoring and controlling the light source includes a feedback arrangement. This feedback arrangement includes an optical detector which is disposed at an angle to the input optical fiber for detecting a predetermined reflected portion of the input light. A variable power source is operably connected to the optical detector and the light source in the feedback arrangement for applying a level of power to the light source dependent upon the light level detected by the optical detector.

BRIEF DESCRIPTION OF THE DRAWINGS

Numerous other objects, features and advantages of the invention should now become apparent upon a reading of the following detailed description taken in conjunction with the accompanying drawings, in which:

FIG. 2 is a cross-sectional view taken along line 2—2 of FIG. 1 showing further details of the optical pressure transducer;

FIG. 3 is a cross-sectional view taken along line 3—3 of FIG. 1 showing further details in particular of the metal flexure plate and spacer plate;

FIG. 4 is a partial cross-sectional view of the optical path in the rest position of the pressure responsive diaphragm;

FIG. 5 is a fragmentary cross-sectional view similar to that illustrated in FIG. 4 but showing somewhat by exaggeration the position of the reflectors upon deflection of the diaphragm;

DETAILED DESCRIPTION

Reference has been made herein before to several earlier patents of the assignee of the present invention. These melt pressure transducer constructions generally employ an elongated frame and in the past when using a filled capillary system, a diaphragm or coupler is employed at the snout end of the frame and a sensing head appears at the opposite end of the frame. The sensing head may employ strain gages or the like for essentially converting a sensed pressure into an electrical signal.

In accordance with the present invention as illustrated herein, a deflection at the diaphragm is sensed optically and this, thus, allows the sensing electronics to be remote from the working environment, or in other words, the place where the diaphragm or coupler is arranged.

Figure 1:
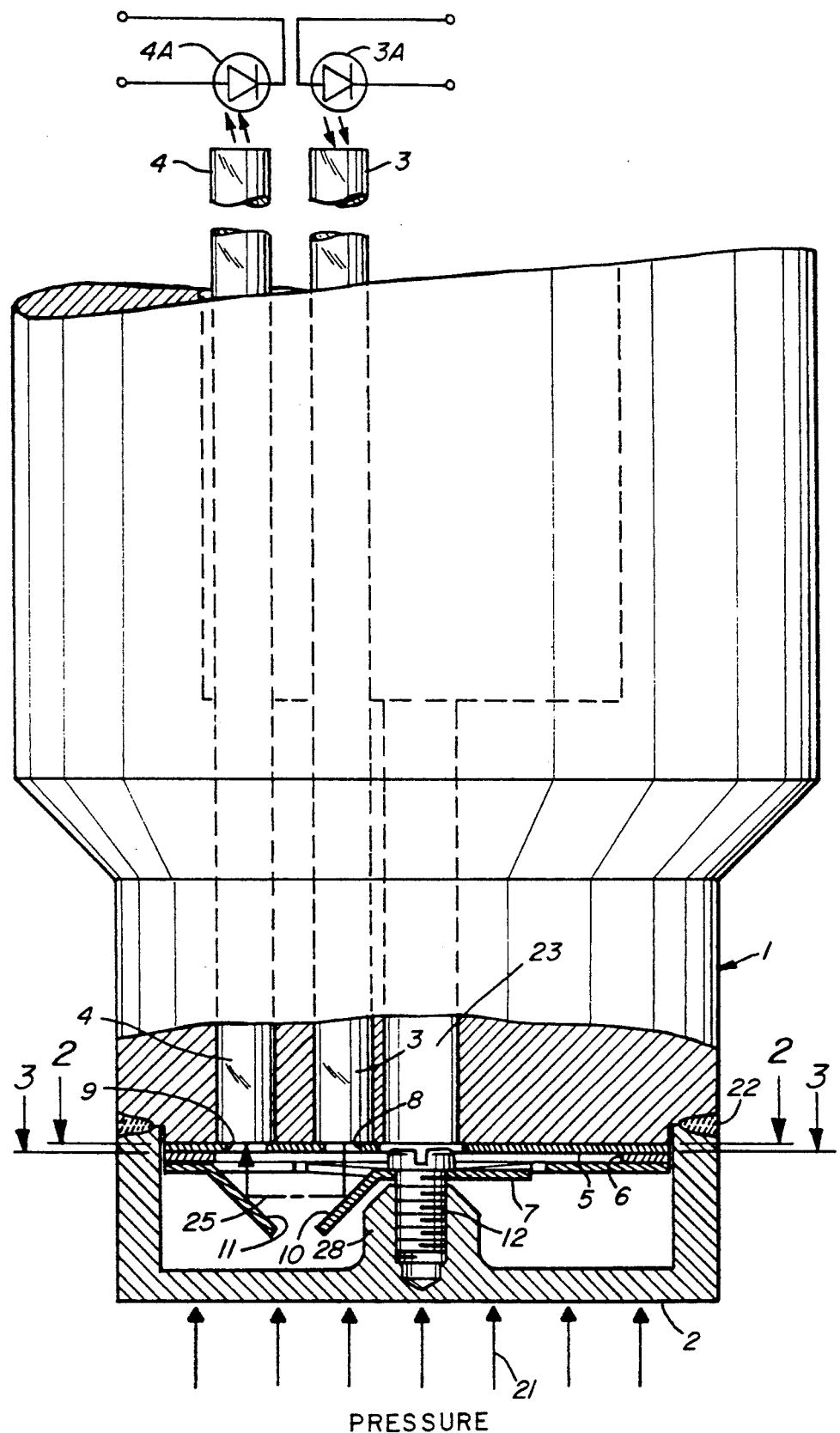
FIG. 1 is a partial sectional view of the optical pressure transducer of the present invention.

With respect to a first embodiment of the invention illustrated in FIGS. 1-3 herein, the optical pressure transducer is considered as being comprised of a body 1 that is preferably constructed of a rigid metal and a force summing diaphragm 2. As noted in FIG. 1, the arrows 21 illustrate the direction in which pressure is applied to the diaphragm 2. It is this pressure that is being sensed by the optical pressure transducer of the invention.

The diaphragm 2 may be constructed of a metal material. Examples of material include stainless steel or a nickel chromium iron alloy. The diaphragm 2 may be welded to the transducer body 1 such as by means of electron beam welding. This is illustrated in FIG. 1 at 22.

Within the body 1 are disposed the optical fibers 3 and 4. FIG. 1 illustrates these optical fibers extending through the body 1. The optical fibers include an input optical fiber 3 which at its top end receives light from a light source such as the illustrated light emitting diode 3A. The lower end of the optical fiber 3 is secured in position flush with the lower end face of the body 1. This is along a plane that is the plane where at the cross-section 2—2 is taken in FIG. 1.

The output optical fiber 4 at its lower end is also disposed in a fixed manner at this same plane. The top end of the fiber 4 is positioned so as to direct output light to a photosensitive element such as the illustrated photodiode 4A.

The transducer body 1 is also provided with a centrally disposed passage 23. This passage is adapted to receive a member such as a screwdriver for turning the adjusting screw 12. This operation is discussed in further detail hereinafter.

In FIG. 1, a broken arrow 25 illustrates an optical path between the fibers 3 and 4. It is this optical path that is interrupted by the reflectors 10 and 11 to be described in further detail hereinafter. This optical path is controlled by a certain masking plate, also identified herein as the aperture plate 5 illustrated in, for example, FIGS. 1 and 2. This aperture plate 5 includes slot-like apertures 8 and 9. The light emanating from the sensor end of the input optical fiber 3 is masked by an input aperture 8 which modifies the light intensity pattern coming from the optical fiber 3. This pattern is reflected down onto the moveable reflector 10 which is connected to the force summing diaphragm 2, by means of the adjusting screw 12.

The modified intensity pattern (optical path 25) is reflected from the moveable reflector 10 to the fixed reflector 11 and from there through the output aperture 9 into the output optical fiber 4. The output aperture 9 blocks a proportional amount of the modified intensity pattern preventing it from entering the output optical fiber 4. The initial amount blocked from the end of the output optical fiber 4 is determined by the initial vertical position of the moveable reflector 10. Application of pressure to the face of the diaphragm 2 causes the moveable reflector 10 to displace vertically changing the proportional amount of the modified intensity pattern entering the receiving end of the output optical fiber 4. This change is detected at the output end of the output optical fiber 4 by a photosensitive device such as the illustrated photodiode 4A.

As indicated previously, upon application of pressure to the diaphragm 2, the moveable reflector 10 is displaced. This is illustrated in, for example, FIG. 5. The initial position of the moveable reflector 10 is shown in phantom outline, while the displaced position of the moveable reflector 10 is shown in solid outline. A comparison between FIGS. 4 and 5 clearly illustrates the manner in which the proportional amount of the intensity pattern is permitted to either be blocked or passed to the output optical fiber 4.

For example, in FIG. 4 there is a far smaller proportion of the reflected signal that enters the optical fiber 4. In FIG. 5, on the other hand, there is a substantially larger proportion of the signal that is passed into the output optical fiber 4.

The optical fibers 3 and 4 may each be a metal coated silica clad, silica core, multi-mode, stepped index optical fiber. These optical fibers may be epoxied into holes provided in the transducer body using a high temperature (600° C.) epoxy. The ends of the optical fibers 3 and 4 and a front face of the body 1 are polished to a mirror finish, along the plane defined by the cross-section 2—2 in FIG. 1. This provides a smooth mounting surface and flat optically clear fiber ends. The smooth mounting surface is for receiving a series of plates and defining, for example, the apertures and reflectors. These various plates are illustrated in FIGS. 2, 3, and 9.

FIG. 2 illustrates the aperture plate 5, in accordance with a first embodiment of the present invention. This may be a photochemically etched metal aperture plate which is placed on the polished surface of the body in a fashion to ensure the alignment of the two apertures 8 and 9 with relationship to the optical fibers 3 and 4. This position is illustrated in FIG. 2. Once the aperture plate 5 is in position, then it may be resistance welded to the transducer body 1.

Next, there is provided a photochemically etched metal spacer plate 6. This is illustrated in FIG. 3. This is also aligned with the aperture plate 5 and is resistance welded thereto. Alignment tabs, holes or the like may be provided for proper alignment of these various plates.

Figure 9:
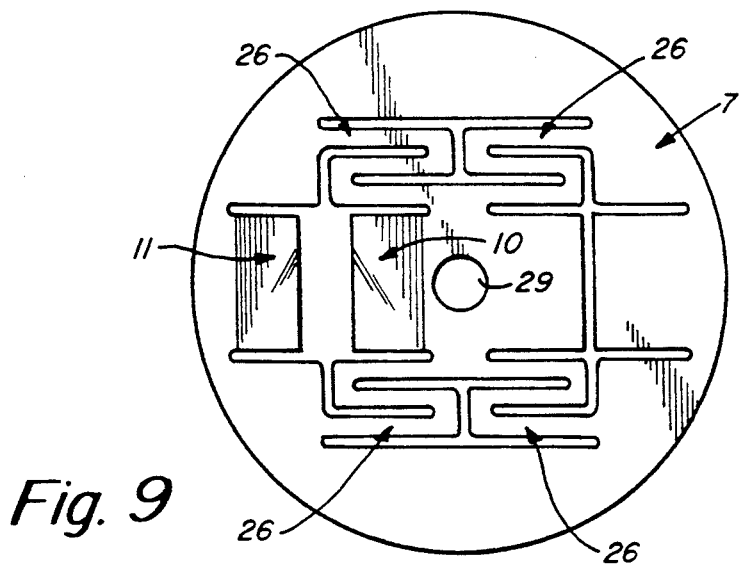
FIG. 9 is a plan view of the specific construction of the reflector plate as in accordance with the disclosed embodiment herein.

Next, reference is made to FIG. 9 which illustrates a plan view of the formed metal flexure plate. This is a photochemically etched plate that has a high temperature capable reflective coating thereon. Again, this plate is aligned in a manner so that the moveable reflector 10 and the fixed reflector 11 are aligned parallel to the apertures 8 and 9 in the aperture plate 5. The flexure plate 7 is then resistance welded through the spacer plate 6 and the aperture plates to the body 1. Reference is made hereinafter to further details of the flexure plate 7, particularly as it relates to the operation of the adjusting screw 12.

In the transducer illustrated in FIG. 1, at the tops of the fibers 3 and 4 the ends of the fibers may be cleaved at the appropriate length, epoxied into the Ferrules, polished, and inserted into a standard source and standard detector for a functional check. With the aid of the standard source/detector, the course offset adjustment screw 12 with a small amount of high temperature epoxy disposed on the threads thereof is adjusted to set the initial vertical position of the moveable reflector 10 to achieve an appropriate output setting from the standard source/detector with its associated electronics. The epoxy on the course offset adjustment screw 12 is allowed to cure to hold the screw 12 in place.

Figure 6:
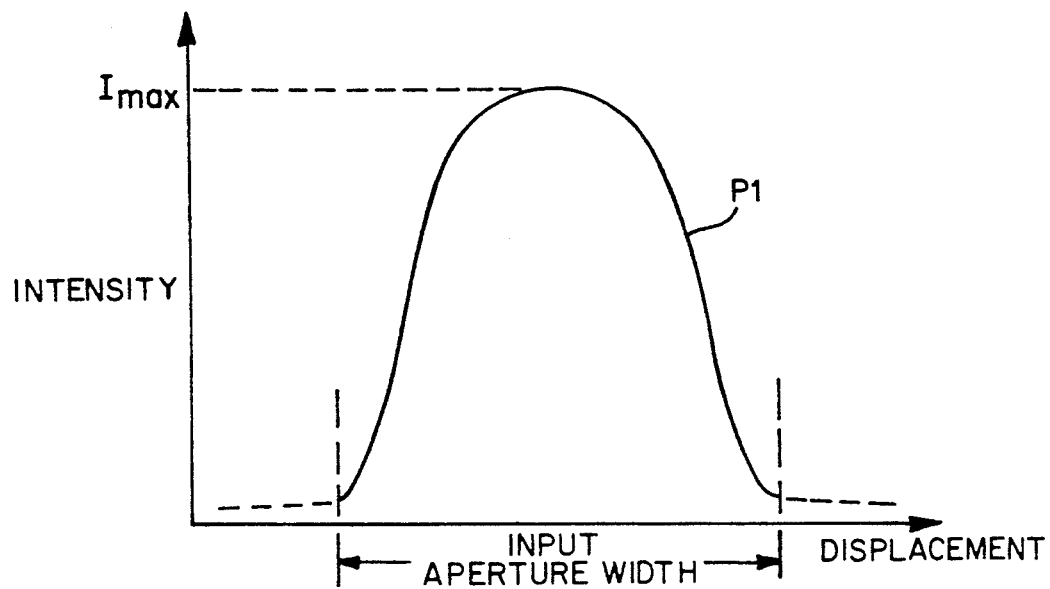
FIG. 6 illustrates the input light intensity pattern.

Now, with regard to FIG. 6, there is illustrated therein an input intensity pattern P 1 that exits from the input optical fiber through the input aperture 8. As also illustrated in FIG. 4, the input intensity pattern P-1 is the one that is at the output of the aperture 8 and is the pattern that is directed to the moveable reflector 10.

Figure 7:
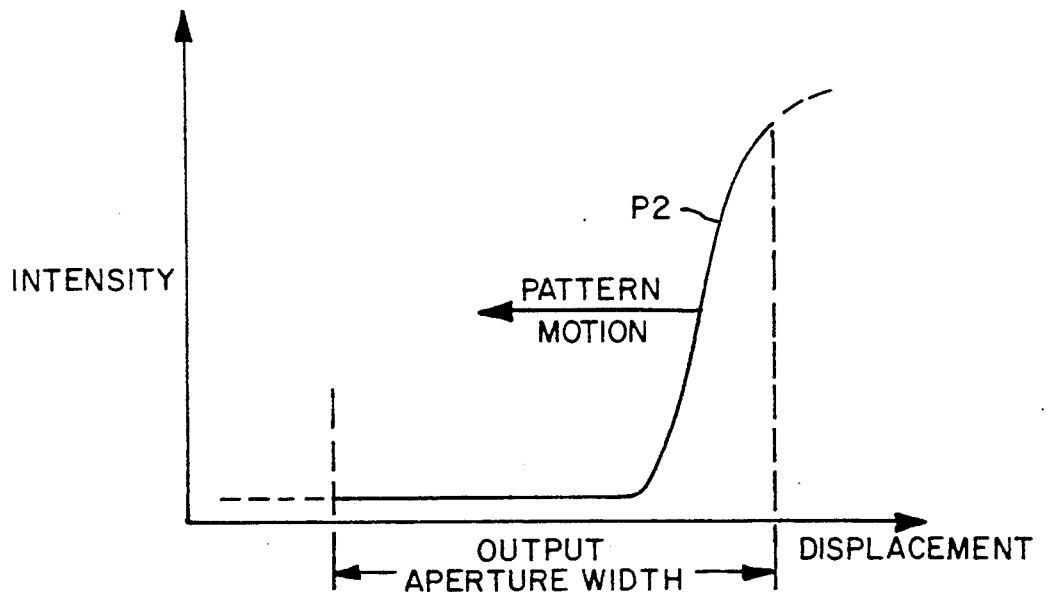
FIG. 7 illustrates the output light intensity light pattern.

FIG. 7 shows the proportional amount of the modified intensity pattern that couples through the output aperture 9 and enters the output optical fiber 4 after the appropriate course offset adjustment screw setting has been made. In FIG. 4, for a normal rest position of the diaphragm this is illustrated as the intensity pattern P-2. Also refer to FIG. 7.

In operation, the unmodified light intensity pattern emitted from the light source travels through the input optical fiber 3 to the input aperture 8 exiting as the modified intensity pattern illustrated in FIGS. 4 and 6. This intensity pattern is reflected down onto the moveable reflector 10 and across to the fixed reflector 11 and from there up to the output aperture 9. The output aperture 9 masks an appropriate proportion of the modified intensity pattern as shown in FIGS. 4 and 7, for example, and, therefore, the amount of light entering the output optical fiber 4 is masked.

Vertical displacement of the moveable reflector 10, as illustrated in FIG. 5, proportionally increases the amount of light intensity pattern entering the output optical fiber 4, and, thus, also the amount of light that is coupled to the photodetector 4A. The initial vertical position and the range of the vertical displacement of the moveable reflector 10 is selected so that the minimum non-linearity of the modified intensity pattern is achieved. In this regard, refer to FIG. 5 for an illustration of the proportional increase in the intensity pattern, identified in FIG. 5 as a pattern P-3 exiting into the output optical fiber 4.

As illustrated in FIGS. 3 and 9, the reflector plate 7 is constructed so that the moveable reflector 10 is attached to the fixed peripheral portion of the plate 7 by means of integral S-shaped flexures 26. There are four such S-shaped flexures illustrated in FIG. 9. These flexures provide support for and permit parallel motion of the moveable reflector 10 in a direction perpendicular to the plane of the plate 7.

During the assembly process, the S-shaped flexures 26 are deformed slightly, at the attachment points on the fixed portion of plate 7, biasing the position of the moveable reflector plate towards the aperture plate 5.

Figure 11:
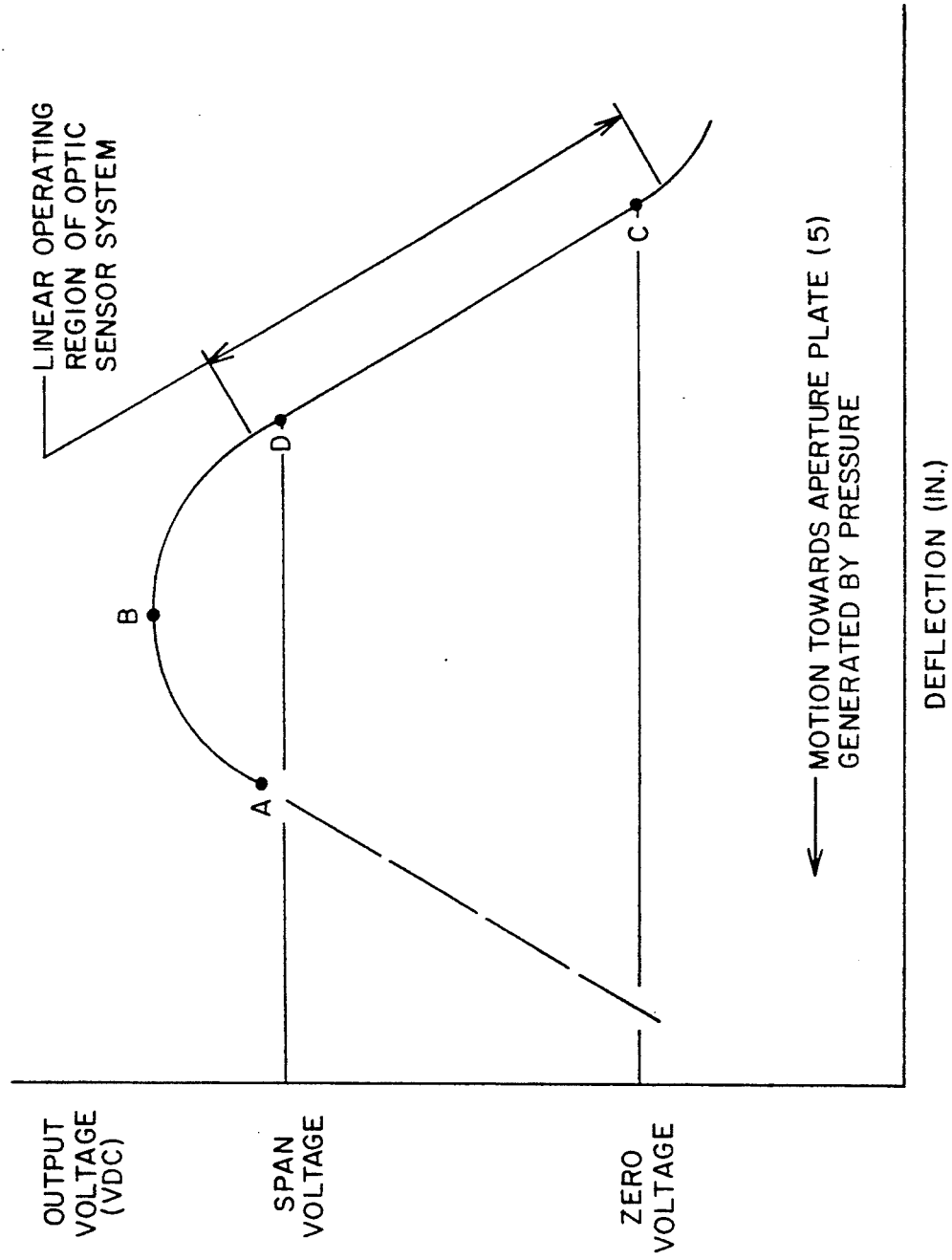
FIG. 11 is a plot of output voltage versus deflection used in explaining the adjustments made in accordance with the transducer of the present invention.

Now, reference is made to FIG. 11 for an illustration of the characteristic conditioned (photosensitive device and associated electronics) DC (direct current) voltage output curve, as a function of the moveable reflector displacement. A clockwise adjustment (tightening) of the calibration screw 12 engages the screw into the threads of the post 28. Then, the bottom of the screw head engages the base of the moveable reflector 10 (the area around the clearance hole 29), indicated as point A on the operating curve.

Continuous clockwise adjustment of the calibration screw 12 gradually moves the moveable reflector 10 towards the diaphragm 2 generating tension in the S-shaped flexures 26. This forces the base of the moveable reflector 10 up against the bottom of the screw head as illustrated in FIG. 1.

As indicated previously, the high temperature epoxy is applied to the screw threads as well as the underside of the screw head prior to insertion through the clearance hole 29 in the moveable reflector 10 and engagement with the threads in the diaphragm post 28. Also, when the epoxy cures, it locks the screw in the diaphragm post as well as locking the moveable reflector 10 to the underside of the screw head.

Before the epoxy cures, however, the calibration screw 12 is adjusted clockwise varying the output voltage through point B in the curve of FIG. 11 (corresponding to the position where the base of the moveable reflector 10 and the base of the fixed reflector 11 are co-planer, yielding the maximum voltage output) to point C, the zero-pressure voltage output, that being the voltage output when no pressure is sensed by the diaphragm P. Point C, or the zero-pressure voltage output, falls at the bottom end of the linear voltage output operating range of the optical sensor, and coincides with the position of the moveable reflector 10 nearest the diaphragm. The linear operating range is the range between the span voltage, during which full range pressure is sensed and maximum deflection occurs, and the zero-pressure voltage, or the linear range between points D and C on the curve. This is the optimal operating range, due to the fact that the slope in the output voltage is steep and linear.

It is furthermore to be noted that the tension generated by the S-shaped flexures 26 on the calibration screw 12 transmitted to the diaphragm post and diaphragm 2 is small in comparison to the opposing force generated by the diaphragm itself.

After the epoxy on the screw 12 cures, this locks the moveable reflector 10 at a position indicated by point C on the operating curve. Pressure generated deflection (deflection fixed for all pressure ranges at 0.001±0.0002 inches) of the highly elastic metal diaphragm 2, towards the aperture plate 5, causes the moveable reflector 10 to move toward the aperture plate 5 to a position shown as point D on the operating curve, or span (full scale) voltage output. Release of pressure returns the moveable reflector 10 to the initial starting position shown as point C on the operating curve.

Accordingly, by proper adjustment of the screw 12, the position of the moveable reflector plate is set up so that it can carry out a full range of pressure detection. Furthermore, this range, as noted by the diagram of FIG. 11, is a linear proportional range.

Figure 8:
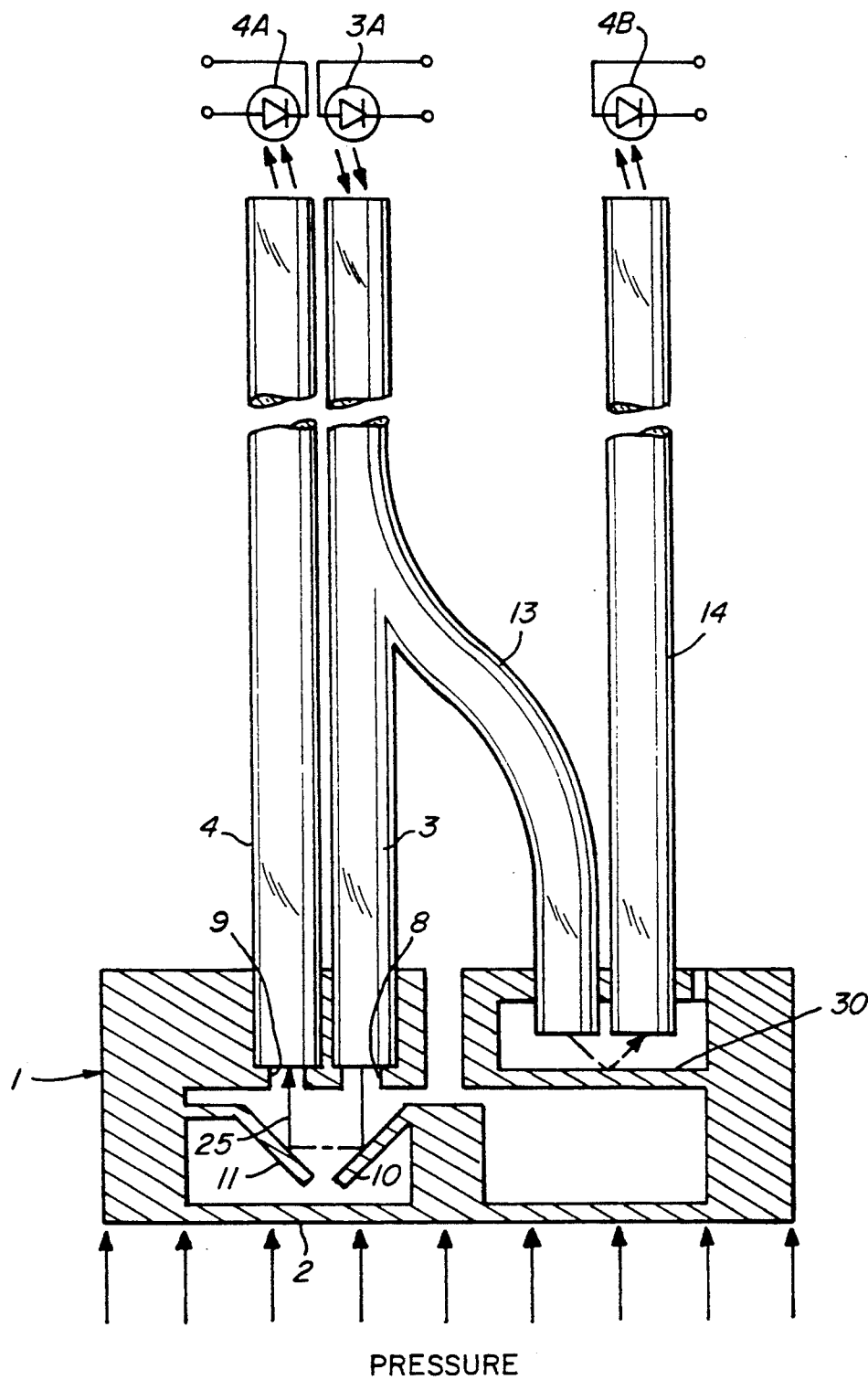
FIG. 8 illustrates a second embodiment of the present invention employing a transducer construction with main optical path similar to that illustrated in FIG. 1 but also including a further reference portion of the transducer.

Reference is now made to FIG. 8 for an alternate embodiment of the present invention. In FIG. 8, like reference characters are used to identify parts previously associated with the first embodiment of the invention such as the one illustrated in FIG. 1. Thus, in the embodiment of FIG. 8 there is illustrated the optical fibers 3 and 4 as well as the reflectors 10 and 11. However, in this embodiment the input optical fiber is divided to form a bifurcated fiber that also includes essentially a separate input optical fiber 13. This bifurcated input optical fiber 13 carries a portion of the input unmodified intensity pattern which is directed to a fixed surface 30 of the transducer body 1. This light is reflected from this surface 30 into a second reference output optical fiber 14. A proportional amount of the reflected light is detected at the output end of the reference optical fiber 14 by a photosensitive device such as the illustrated photodiode 4B. The combination of the light source, bifurcated input optical fiber 13, and fixed reflective surface 30 provide a feedback arrangement for controlling certain detection signals associated with the transducer. This feedback arrangement coupled to the conditioning electronics (not shown) minimizes signal errors externally induced by microbending of the optical fibers, and temperature induced dimensional changes in the mechanics of the transducer body 1.

Figure 10:
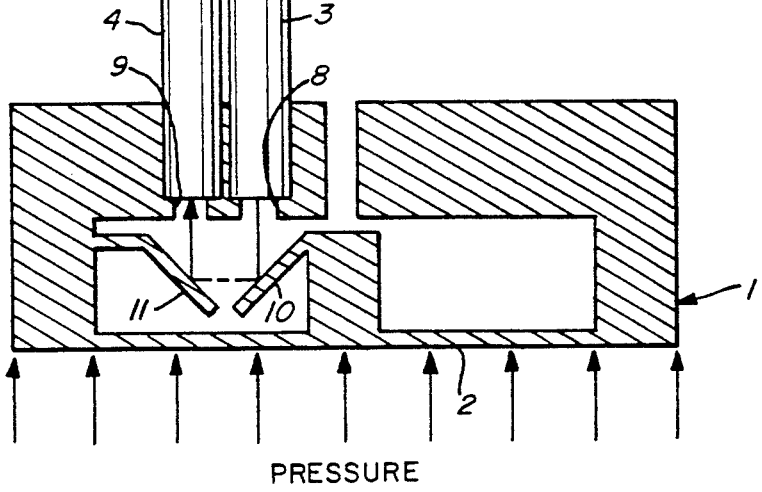
FIG. 10 illustrates a third embodiment of the present invention.

FIG. 10 illustrates still a further embodiment of the present invention. Again, in FIG. 10 the same reference characters are used to identify similar parts previously described in association with FIGS. 1 and 8. In the embodiment of FIG. 10, the input optical fiber 3 is also divided to form a bifurcated input/output optical fiber 33. This bifurcated input/output optical fiber 33 carries a portion of the unmodified intensity pattern from the light source directly to a second photosensitive device such as the illustrated photodiode 4C. The combination of the input optical fiber, the bifurcated fiber and the additional photosensitive device provide a feedback arrangement to the conditioning electronics to minimize signal errors due to light source drift with time/temperature and photosensitive device thermal effects. Microbending of the fiber is not addressed in this particular configuration.

Figure 12:
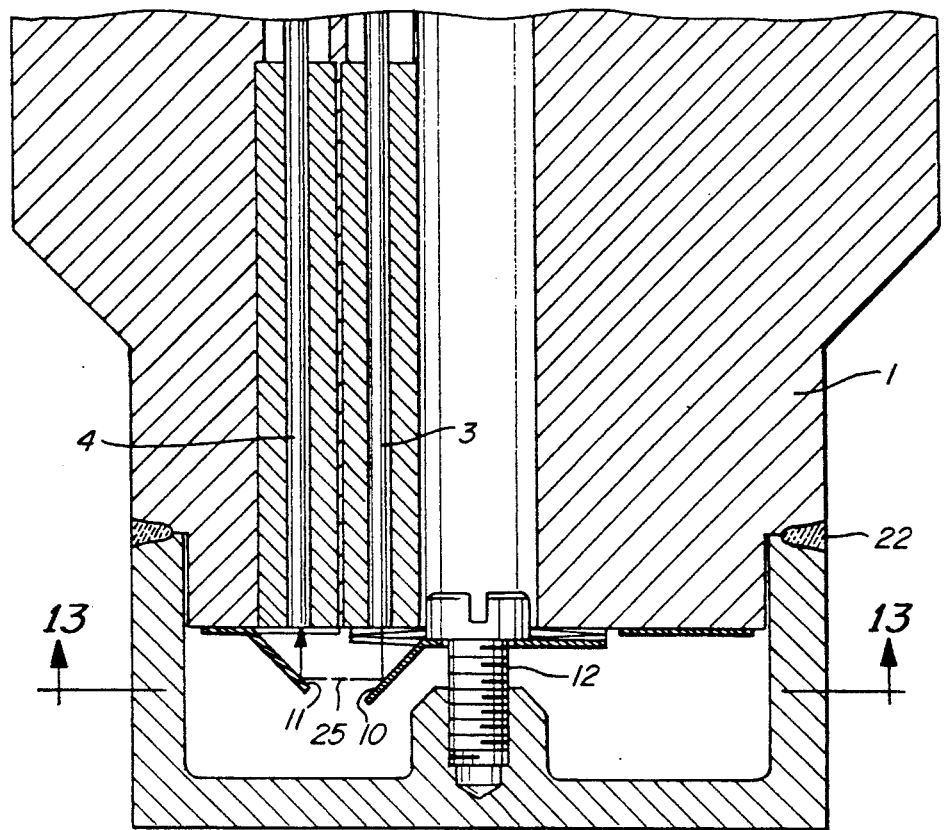
FIG. 12 is a partial sectional view of the optical pressure transducer according to a preferred embodiment of the present invention.

In a preferred embodiment of the present invention aperture plate 5 and metal spacer plate 6 are removed from the optical pressure transducer. This embodiment is illustrated in FIG. 12 where like elements are referred to by the same reference characters. It is to be appreciated that in this embodiment, the input optical fiber 3 and output optical fiber 4 act to mask the light, as will be illustrated in greater detail hereinafter.

Figure 13:
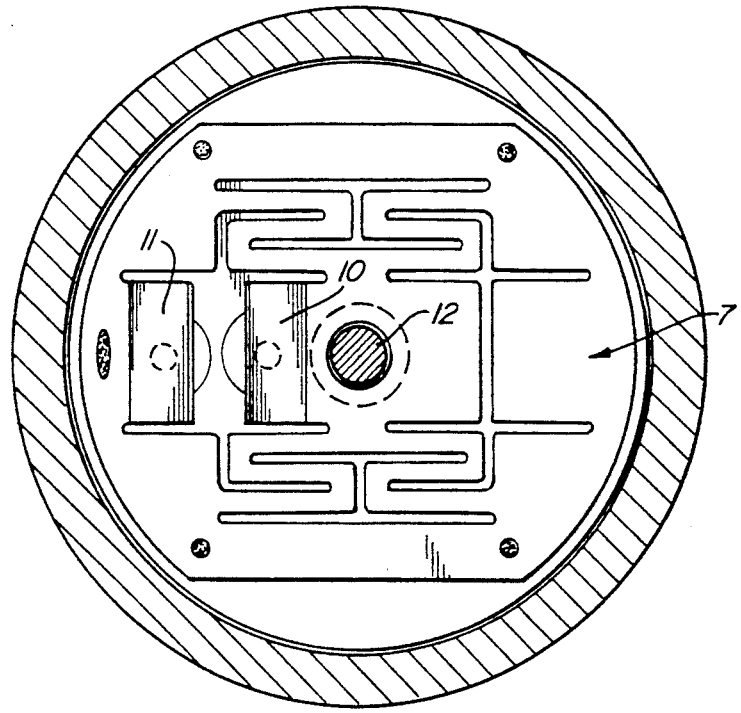
FIG. 13 is a cross-sectional view taken along line 13—13 of FIG. 12 showing further details of the optical pressure transducer according to this preferred embodiment.

FIG. 13 illustrates a plan view of the formed metal flecture plate 7 according to this preferred embodiment without the aperture plate 5 and metal spacer plate 6. This is a photochemically etched plate 7 that has a high temperature reflective coating thereon. This plate is aligned in a manner so that the moveable reflector 10 and fixed reflector 11 are aligned with the input optical fiber 3 and output optical fiber 4, respectively. The flecture plate 7 is resistance welded directly to the body 1.

Figure 14:
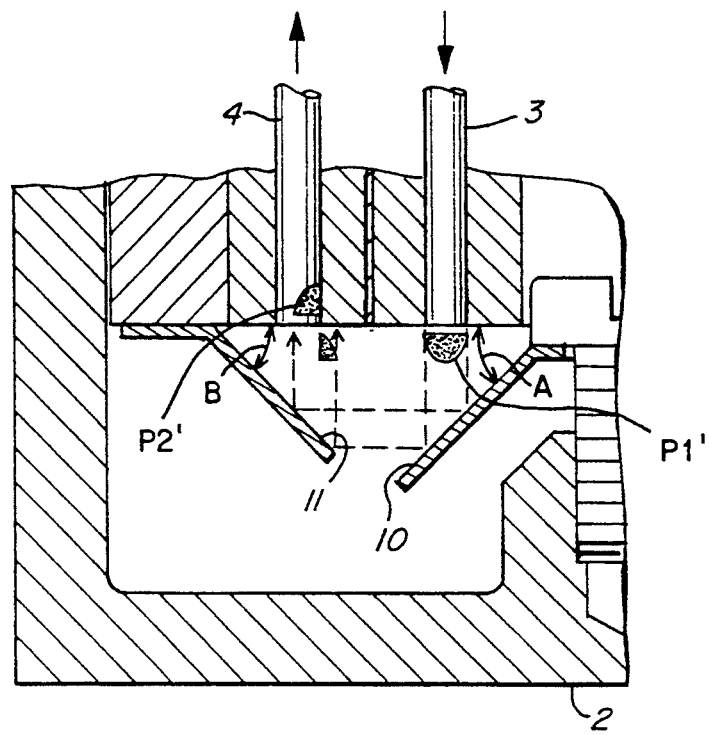
FIG. 14 is a partial cross-sectional view of the optical path with the diaphragm in the rest position according to a preferred embodiment of the present invention.

FIG. 14 illustrates the path which the light follows in this preferred embodiment when no pressure is sensed and the diaphragm 2 does not deflect. As illustrated in FIG. 14, input intensity pattern P1' is inputted from input optical fiber 3, reflects off of moveable reflector 10, moves to fixed reflector 11 and is reflected therefrom to output optical fiber 4. Only a portion of the reflected light is outputted as output intensity pattern P2' into output optical fiber 4. The remainder of the reflected light is masked by output optical fiber 4 itself.

Figure 15:
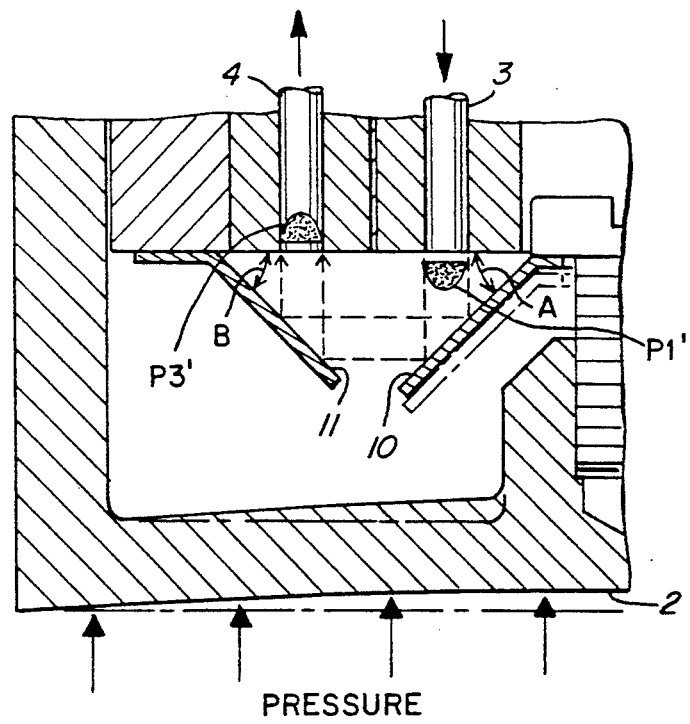
FIG. 15 is a partial cross-sectional view similar to that illustrated in FIG. 14 but showing the position of the reflectors upon deflection of the diaphragm according to a preferred embodiment of the present invention.

FIG. 15 illustrates the path of the light according to this preferred embodiment without the aperture plate, during an intermediate pressure sensed condition in which the diaphragm 2 has deflected somewhat. As illustrated in FIG. 15, input intensity pattern P1' is inputted from input optical fiber 3, reflects off of moveable reflector 10, which is displaced somewhat by the deflection of diaphragm 2, is reflected off of fixed reflector 11 and the full output intensity pattern P3' is outputted into output optical fiber 4. As shown, nearly the full input intensity pattern P1' is outputted as P3' to the output optical fiber 4 in this intermediate pressure sensed condition. The output intensity pattern P3', outputted to the output optical fiber 4 in this intermediate pressure sensed condition is much greater than the output intensity pattern P2', outputted to the output optical fiber, when in the zero-pressure condition.

Figure 16:
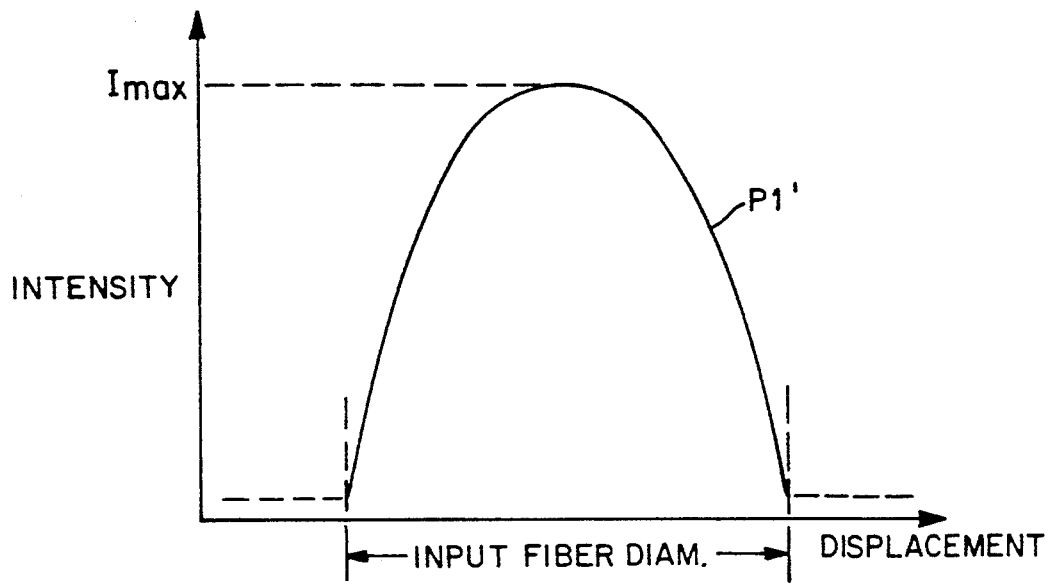
FIG. 16 illustrates the input light intensity pattern according to a preferred embodiment of the present invention.
Figure 17:
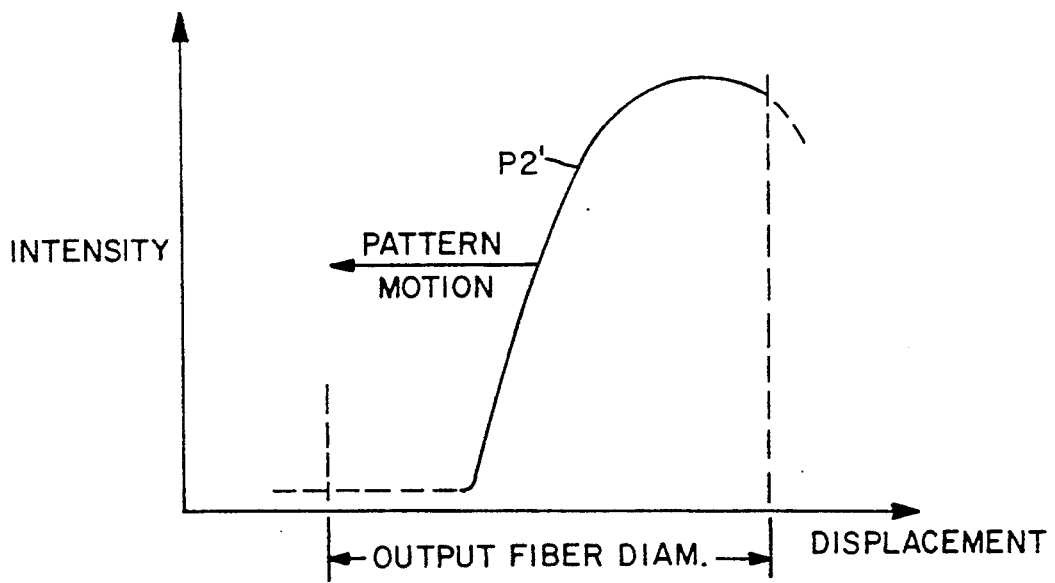
FIG. 17 illustrates the output light intensity pattern according to a preferred embodiment of the present invention.

As can be seen in FIG. 14, the output optical fiber 4 acts to mask a portion of the output intensity pattern P2'. Therefore, the aperture plate with apertures 8 and 9, as illustrated in the first embodiment of the present invention, is not necessary. As illustrated in FIG. 16, input intensity pattern P1' is shaped by the diameter of the input fiber. Similarly, as illustrated in FIG. 17, output intensity pattern P2' is shaped by the diameter of the output optical fiber 4.

Figure 18:
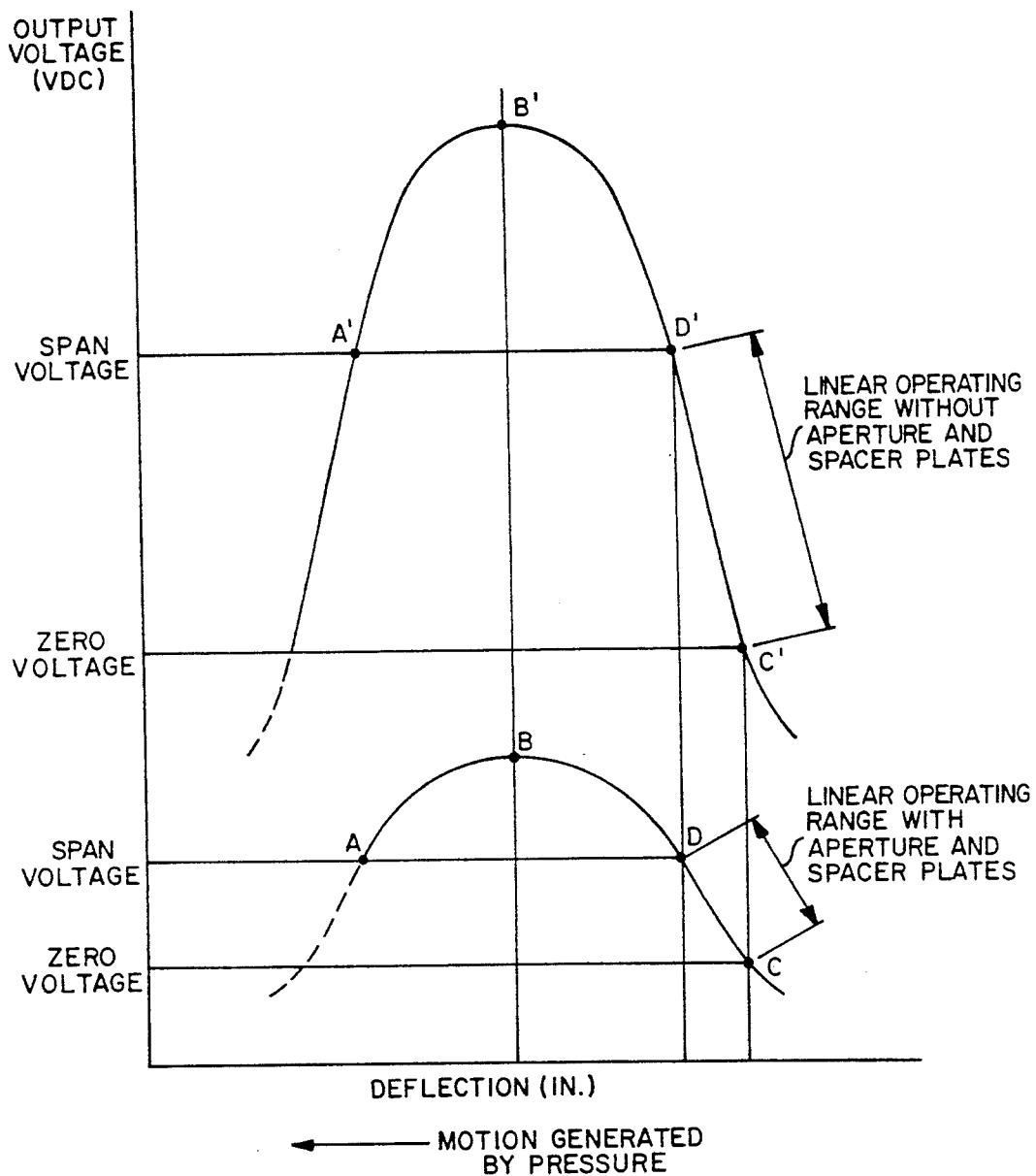
FIG. 18 is a plot of output voltage verses deflection for both the first embodiment of the present invention and the preferred embodiment of the present invention.

Not only is the aperture plate 5 with apertures 8 and 9 not necessary, but the results achieved by the removal of the aperture plate are advantageous. When the input and output optical fibers act to mask the input and output light intensity patterns respectively, as illustrated in FIGS. 14–17, the linear operating range and steepness of the slope of the output voltage between the span voltage and zero-pressure voltage are both increased. This result is illustrated in FIG. 18. As illustrated, the output voltage curve for both the preferred embodiment, without the aperture plate and spacer plate, and output voltage curve for the first embodiment, utilizing the aperture plate and spacer plate, are illustrated. As illustrated, the linear operating range between D' and C' of the output voltage for the preferred embodiment, not only has a much steeper slope, but covers a greater range than the linear operating range through points D and C of the output voltage for the first embodiment. The zero-pressure output voltage C' of the preferred embodiment is at a much higher voltage level than the zero-pressure output voltage C of the first embodiment. The span voltage A'-D' of the preferred embodiment is at a much higher level than the span voltage A-D of the first embodiment. Therefore, the accuracy of the optical pressure transducer without the aperture plate and spacer plate is greatly increased. In addition, the operating range is greatly increased. Further, the higher output voltages help the thermal effects and increase performance of the pressure transducer. Moreover, inherent noise associated with the pressure transducer becomes less significant with the higher zero-pressure output voltages and span output voltages.

As illustrated in FIGS. 14 and 15, the angles A and B between the moveable reflector 10 and a horizontal bottom surface below the optical fibers, and the fixed reflector 11 and the same horizontal surface, are preferably 45°. Both angles A and B are within the range of 45°±10°. It is to be appreciated that a change in the angles A and B affects the output intensity pattern P2'. A change in the angle A more greatly affects the output intensity pattern than a change in the angle B because the angle A is associated with the moveable reflector 10 and the output intensity is compounded by the reflection off of reflector 11. Therefore, changes in these angles affects the gain and sensitivity of the optical pressure transducer. With respect to angle A, as angle A is decreased the transducer becomes more sensitive to the deflection of the diaphragm 2. Note also that the locus of optical intersection between the reflectors is approximately at the midpoint between the two optical fibers.

Figure 19:
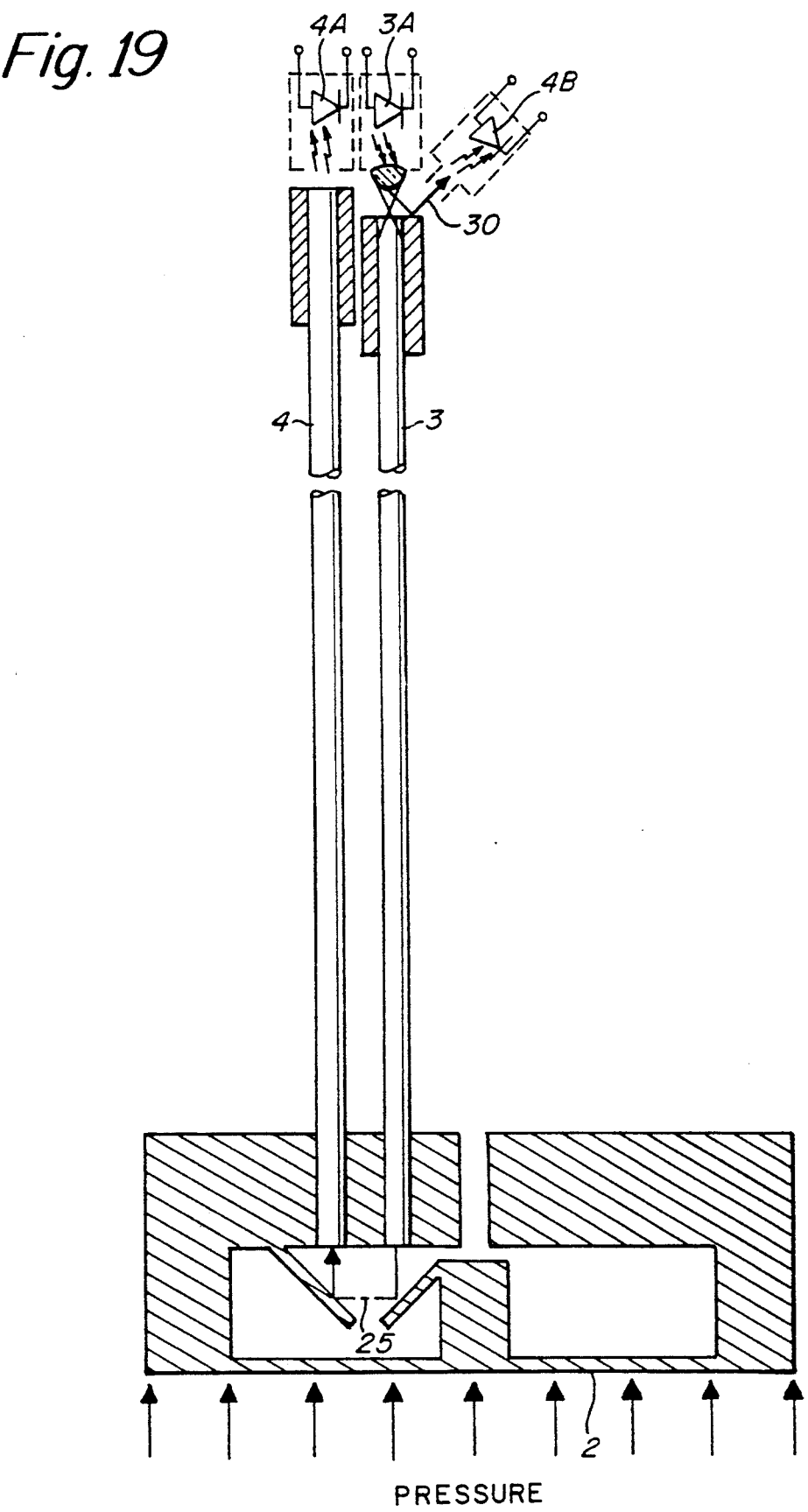
FIG. 19 is a partial sectional view of an optical pressure transducer according to an alternate embodiment of the present invention.

In an alternate embodiment of the present invention, the light source 3A is monitored and provided with a variable power source such that the input light remains constant. It is to be appreciated that light emitting diodes (LEDs) loose power as a function of time. For proper operation of the optical pressure transducer it is necessary for the input light not only to be maximized but to remain constant. Therefore, the alternate embodiment, as illustrated in FIG. 19, provides an arrangement by which the input light intensity is monitored. As illustrated, an additional optical detector (photodiode) 4B is provided at an angle to input optical fiber 3 and receives a reflected portion 30 of the input light provided by input light source (LED) 3A. In this manner, photodetector 4B can detect changes in the input light. When a decrease in input light intensity is detected by photodetector 4B, additional power is provided to input light source 3A to compensate and provide for a constant level of light generation.

Figure 26:
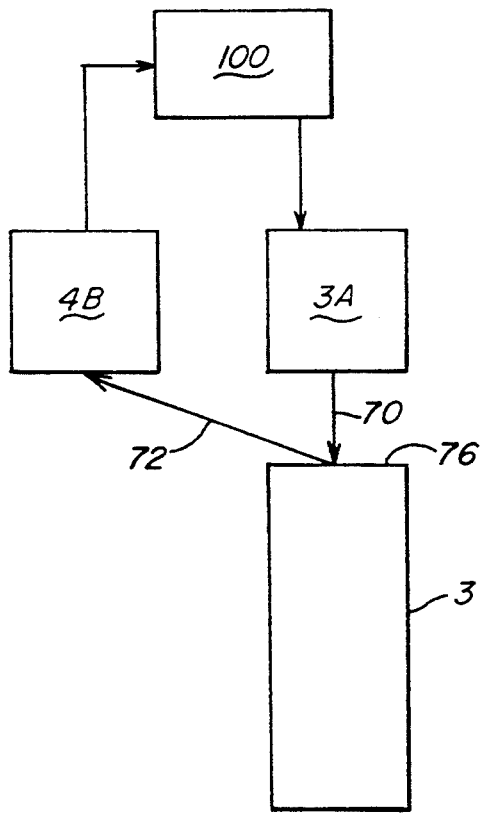
FIG. 26 is a block diagram of the feedback arrangement of an alternate embodiment of the present invention.

Referring to FIG. 26, the feedback arrangement of the present invention is illustrated in block diagram form. As illustrated, input light 70 is generated by LED 3A and inputted to input optical fiber 3. A portion 72 of the input light 70 is reflected off of surface 76 to photodector 4B. Photodector 4B detects the intensity of reflected light 72. When this reflected light falls below a predetermined intensity, circuit 100 provides power to LED 3A, for compensation purposes, such that LED 3A will increase its output intensity and maintain a constant input light 70. The feedback arrangement includes photodetector 4B, circuit 100, and LED 3A. Detector 4B outputs a signal to circuit 100 representing the intensity of reflected light 72. Circuit 100 then compares this intensity signal with a threshold voltage. When this comparison reveals that the reflected light 72 has lowered in intensity, a variable power supply (not shown) included in circuit 100, provides increased power to LED 3A.

Figure 20:
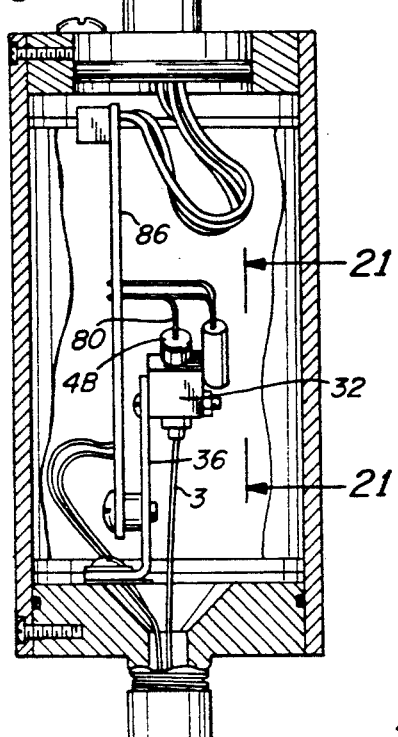
FIG. 20 is a partially exposed side view of the optical pressure transducer according to an alternate embodiment of the present invention.

FIG. 20 is a partially exposed view of an optical pressure transducer according to this alternate embodiment. As illustrated, the pressure transducer includes LED 3A and photodetector 4B. LED 3A feeds into input fiber 3 which runs through body 90 of the transducer. LED 3A is attached to LED sleeve 62 and photodetector 4B is attached to detector sleeve 50, both of which are attached to LED block 32 which in turn is attached to bracket 36 at slot 48. Photodetector 4B receives input and output wires 80 which contact circuit board 86. Input wires 82 run from circuit board 86 to LED 3A. With such a feedback arrangement, when photodetector 4B detects a decrease in input light generated by LED 3A, a signal is sent representing such decrease to circuit board 86 which in turn causes a proportional amount of power to be sent to LED 3A to compensate for such decrease. It is to be appreciated that photodetector 4B only receives a predetermined reflected portion of the input light generated by light source LED 3A, as will be illustrated hereinafter in greater detail.

Figure 21:
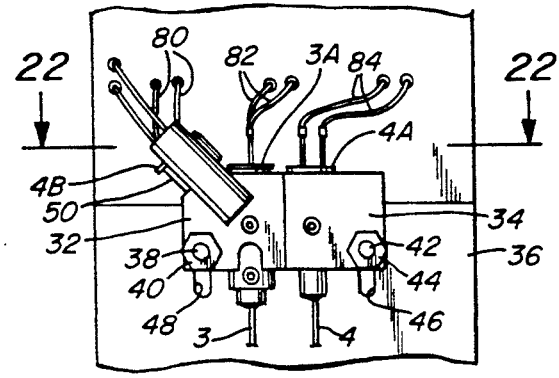
FIG. 21 is a cross-sectional view taken along line 21—21 of FIG. 20 according to an alternate embodiment of the present invention.

FIG. 21 is cross-sectional view taken along lines 21—21 of FIG. 20. As illustrated, the assembly consists of LED block 32 and adjacent detector block 34. Blocks 32 and 34 are affixed to bracket 36 by screws 38 and 42 and nuts 40 and 44, into slots 48 and 46 respectively. Screws 38 and 42 run through slots 48 and 46 of bracket 36 allowing blocks 32 and 34 to move within these slots when screws 40 and 44 are loosened. Block 32 contains LED sleeve 62 which contains light source LED 3A and detector sleeve 50 which houses detector 4B. Detector block 34 holds detector 4A. LED 3A provides light to input optical fiber 3 while output optical fiber 4 transmits the sensor output light into detector 4A. Note output wires 84 which run from detector 4A to circuit board 86.

Figure 22:
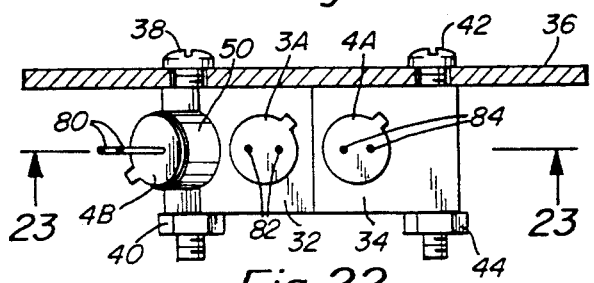
FIG. 22 is a cross-sectional view taken along line 22—22 of FIG. 21 according to an alternate embodiment of the present invention.

FIG. 22 is a cross-sectional view taken along lines 22—22 of FIG. 21. FIG. 22 more clearly illustrates the relationship between LED block 32 and detector block 34.

Figure 23:
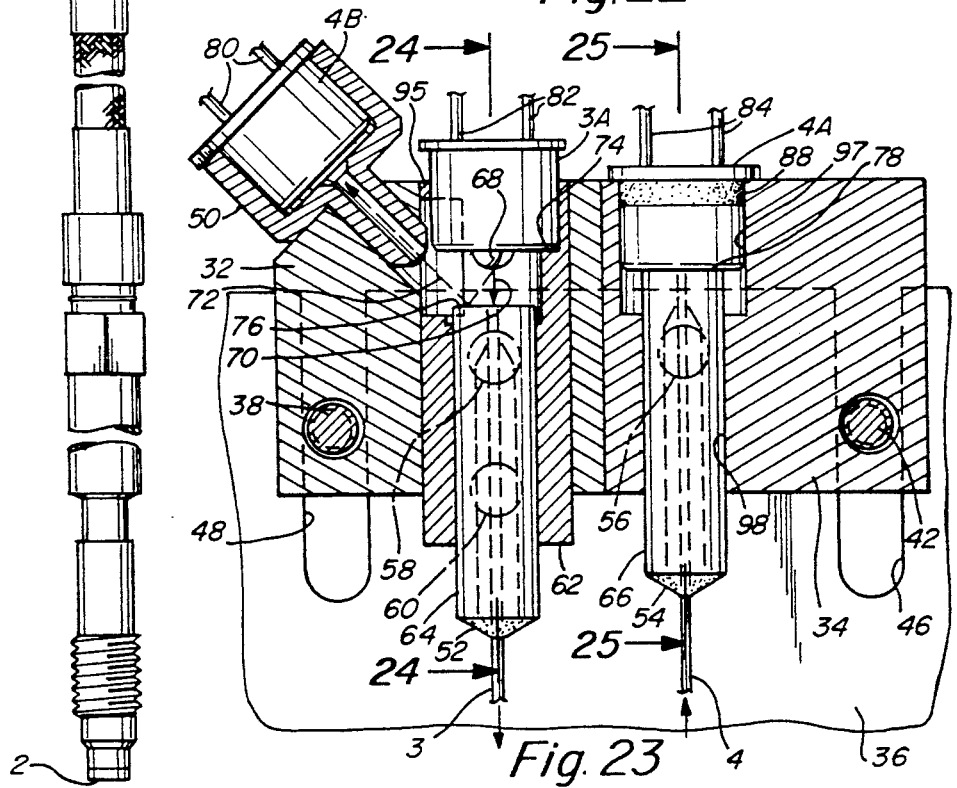
FIG. 23 is a cross-sectional view taken along line 23—23 of FIG. 22 according to an alternate embodiment of the present invention.

FIG. 23 is a cross-sectional view taken along line 23—23 of FIG. 22. As illustrated, LED block 32 is disposed adjacent to detector block 34, both of which are affixed to bracket 36.

LED block 32 houses detector sleeve 50 and LED sleeve 62 containing light source 3A. Light source 3A rests within LED sleeve 62 against lip 68 thereof. Also within LED sleeve 62 is Ferrule assembly 64. Detector block 34 includes detector 4A and Ferrule assembly 66. Ferrule assemblies 64 and 66 are attached to input optical fiber 3 and output optical fiber 4, respectively, via adhesives 52 and 54. Surface 76 of Ferrule assembly 64 and surface 78 of Ferrule assembly 68 are polished to a mirror finish (less than or equal to 0.05 micron surface) by means of mechanical polishing techniques. During operation, light source 3A through focus point 68 provides light illustrated by arrow 70 into input fiber 3. A predetermined portion of this light is reflected off of surface 76 to assembly 52 and detector 4B.

Detectors 4A and 4B are devices with a glass sealed lensed metal enclosures designed for maximum longevity, stability and optic sensitivity and matched to the optic output characteristics of LED 3A. Detector 4B is bonded to metal sleeve 50 with an appropriate adhesive with good thermal and long term stability characteristics. Sleeve 50 is bonded to LED block 32 with a similar appropriate adhesive. Detector 4A is bonded into hole 97 provided in the rear of detector block 34 with a similar appropriate adhesive. The optical fibers 3 and 4 are bonded to the Ferrule assemblies 64 and 66, respectively, with thermal matching characteristic adhesive 52 and 54, prior to polishing, also possessing good thermal and long term stability characteristics. Ferrule assembly 66 is installed into hole 68 within detector block 34. Hole 98 is concentric to hole 97 thereby providing a direct optical path from output optical fiber 4, through Ferrule assembly 66 to optical detector 4A. Polished surface 78 of Ferrule assembly 66 is spaced sufficiently from the lensed surface of detector 4A to minimize electo-magnetic interference while maintaining sufficient light to detector 4A. Similarly, polished surface 76 of Ferrule assembly 64 is spaced sufficiently from the lensed surface of LED 3A and from detector 4B to maximize the light coupled from LED 3A directly into input optical fiber 3 and reflected to detector 4B from polished surface 76.

Figure 24:
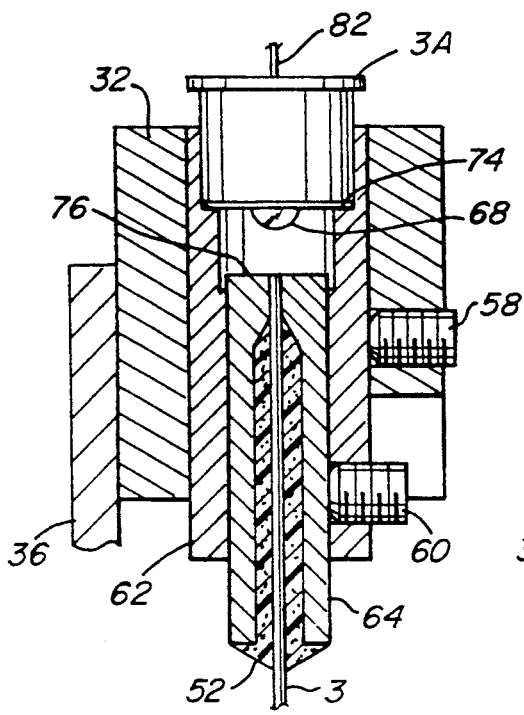
FIG. 24 is a cross-sectional view taken along line 24—24 of FIG. 23 according to an alternate embodiment of the present invention.

Setscrews 56, 58 and 60 are utilized to assist in achieving appropriate relative positioning of the components to receive the required light levels during the initial set up procedure and holding the relative positions of the elements during the adhesive bonding of these components. These components include main LED sleeve 62, Ferrule assembly 64 and 66, and the blocks 32 and 34. Referring now to FIG. 24, the set-up procedure will be described. Firstly, set screw 58 is tightened and set screw 60 is loosened. Set screw 58 locks LED block 32 to LED sleeve assembly 62. The loosening of set screw 60 allows LED sleeve assembly 62 to move relative to Ferrule assembly 64. In this condition, LED block 32 and LED sleeve assembly 62 are moved as a unit back and forth relative to Ferrule assembly 64. This movement increases or decreases the distance between LED 3A and polished surface 76 of Ferrule assembly 64. During this movement, detector 4A detects the amount of light outputted from output optical fiber 4, which is directly related to the amount of light inputted to input optical fiber 3. When this light is at a maximum the position of LED block 32 and main LED sleeve 62 is held and set. At this point set screw 60 is tightened, locking the positions of main LED sleeve 62 and Ferrule assembly 64 relative to one another. In this position the light generated by LED 3A, and inputted to input optical fiber 3, is at a maximum at optimum position.

At this point, with set screw 60 tightened and main LED sleeve 62 locked to Ferrule assembly 64, set screw 58 is loosened, thereby allowing movement between LED block 32 and main LED sleeve 62. The movement between LED block 32 and main LED sleeve 62 changes the distance between photodetector 4B and polished surface 76 of Ferrule assembly 64. During this movement, the amount of light reflected off of polished surface 76 to photodetector 4B is monitored. When this reflected light is optimal or at a maximum, this optimum position is held and set screw 58 is tightened, thereby locking the position of LED block 32 and main LED sleeve 62 relative to one another. This locking sets the position of metal sleeve 50 and photodetector 4B with respect to Ferrule assembly 64. Thus, at this point, the input light generated by LED 3A and inputted to input fiber 3, and the reflected light reflected to photodetector 4B, are at a maximum or optimum level as desired for accurate operation of the transducer.

Figure 25:
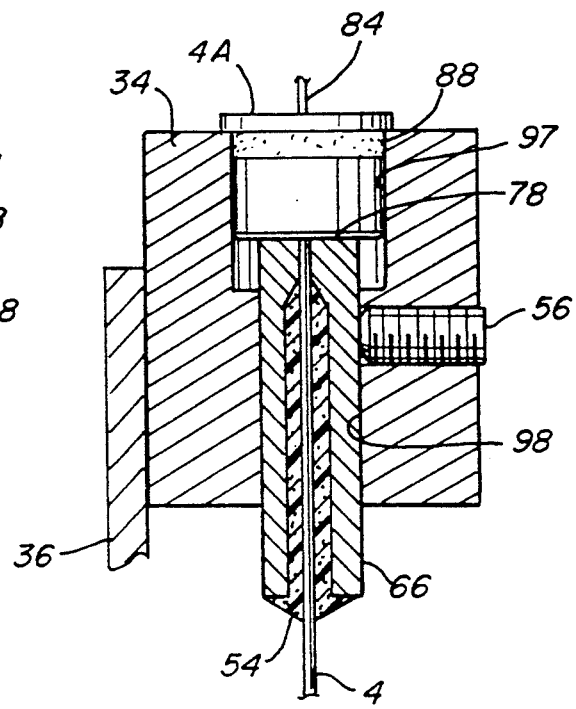
FIG. 25 is a cross-sectional view taken along line 25—25 of FIG. 23 according to an alternate embodiment of the present invention.

Referring to FIG. 25, in a similar fashion to that described above, the positioning of Ferrule assembly 66 is set with respect to detector block 34 such that the optimum amount of light is outputted from output optical fiber 4 to optical detector 4A. It is to be appreciated that optical detector 4A is fixed with respect to detector block 34. Optical fiber 4A rests within hole 97 in detector block 34 and is adhesively attached thereto with adhesive 88.

It is further to appreciated that during the initial setup stage, LED 3A can be rotated within the main LED sleeve to achieve the maximum output at photodetector 4A before adhesively locking it in position. LED 3A is held in place against shoulder 74 during this adjustment by tab 95. Photodetectors 4A and 4B, main LED sleeve 62, LED 3A, and Ferrule assemblies 64 and 66 are locked in place within hole 97, LED block 32 and detector block 34.

During operation, the reflected light 72 from polished surface 76 of Ferrule assembly 64 is detected by photodetector 4B. This reflected amount of light is a predetermined reflected amount of light (as determined during the initial set-up stage). The light detected is compared with an accurate reference voltage. When this reflected (detected) amount of light drops in intensity, more power, in form of current, is fed to LED light source 3A to increase the amount of light generated, thereby maintaining a constant level of output light to be inputted to input fiber 3. As previously mentioned, it is very important for accurate operation of the optical pressure transducer for a constant amount of input light to be generated. This arrangement of having a small portion of the input light be reflected to a detector which compares that reflected light to an accurate reference voltage and provides power to the LED through a feedback arrangement, is an inexpensive yet accurate way of providing for constant input light.

Having now described a limited number of embodiments of the present invention, it should now be apparent to those skilled in the art the numerous other embodiments and modifications thereof are contemplated as falling within the scope of the present invention as defined by the appended claims.

What is claimed is:

1. A pressure transducer comprising:
   a body;
   an input optical fiber for receiving input light, disposed in said body, and having a lengthwise axis;
   an output optical fiber, disposed in said body, and having a lengthwise axis, the body absent a masking plate at an end of the input optical fiber adjacent the diaphragm for attentuating the input light;
   a force responsive diaphragm, secured to the body, having an at rest position when no pressure is sensed and deflected positions when different levels of pressure are sensed;
   a fixed position reflector secured to the body;
   a moveable reflector;
      wherein the reflectors are positioned in the optical path between the input and output optical fibers and reflect at least a portion of input light from the input optical fiber to the output optical fiber; and means for securing the moveable reflector to the diaphragm such that the moveable reflector moves with the diaphragm and wherein a greater amount of light is reflected to the output optical fiber when the diaphragm is in an intermediate deflected position than when the diaphragm is in the at rest position.

2. A pressure transducer as set forth in claim 1 wherein the moveable reflector has a reflecting surface in line with the axis of the input optical fiber.

3. A pressure transducer as set forth in claim 2 wherein the fixed and moveable reflectors have reflecting surfaces disposed at a substantially 90 degree angle relative to one another.

4. A pressure transducer as set forth in claim 3 wherein the axes of the optical fibers are substantially parallel.

5. A pressure transducer as set forth in claim 4 wherein both reflectors are disposed at substantially 45 degree angles to a surface perpendicular to the axes of said optical fibers.

6. A pressure transducer as set forth in claim 5 wherein the locus of optical intersection of both reflectors is substantially at a midpoint between the input and output optical fibers.

7. A pressure transducer as set forth in claim 6 wherein the means for securing includes an adjustable member.

8. A pressure transducer as set forth in claim 7 further including a light source disposed substantially in line with the axis of the input optical fiber for establishing an optical signal to the input optical fiber.

9. A pressure transducer as set forth in claim 8 further including a first optical detector disposed substantially in line with the axis of the output optical fiber for detecting an optical signal outputted from said output optical fiber.

10. A pressure transducer as set forth in claim 9 further including a second optical detector disposed at an angle to the axis of said input optical fiber for detecting a predetermined portion of the optical signal established by said light source.

11. A pressure transducer comprising:
a body;
an input optical fiber, disposed within the body, and having a lengthwise axis;
a light source for generating input light to said input optical fiber;
an output optical fiber, disposed within the body, and having a lengthwise axis;
a force responsive diaphragm, secured to the body, which deflects in response to sensed pressure;
a fixed position reflector secured to the body;
a moveable reflector, wherein the reflectors are positioned in the optical path between the input and output optical fibers and the reflectors reflect at least a portion of input light from the input optical fiber to the output optical fiber;
means for securing the moveable reflector to the diaphragm such that the moveable reflector moves with the diaphragm, and wherein the amount of light reflected depends upon the deflection of the diaphragm; and
means for monitoring and controlling the light source such that the amount of light generated by said light source remains constant.

12. A pressure transducer as set forth in claim 11 further including a first optical detector disposed substantially in line with the axis of the output optical fiber for detecting the amount of light outputted from said output optical fiber.

13. A pressure transducer as set forth in claim 12 wherein the means for monitoring and controlling includes a feedback arrangement.

14. A pressure transducer as set forth in claim 13 wherein the means for monitoring and controlling includes a second optical detector disposed at an angle to the axis of the input optical fiber for detecting a predetermined portion of the input light.

15. A pressure transducer as set forth in claim 14 wherein said predetermined portion of input light is light reflected off of an end of the input optical fiber adjacent the light source.

16. A pressure transducer as set forth in claim 15 wherein the means for monitoring and controlling further includes a variable power source operably connected to said second optical detector and said light source in said feedback arrangement for applying a level of power to said light source dependent upon the light level detected by said second optical detector.

17. A pressure transducer as set forth in claim 16 wherein the light source includes an LED.

18. A pressure transducer as set forth in claim 17 wherein the moveable reflector has a reflecting surface in line with the axis of the input optical fiber.

19. A pressure transducer as set forth in claim 18 wherein the fixed and moveable reflectors have reflecting surfaces disposed at a substantially 90 degree angle relative to one another.

20. A pressure transducer as set forth in claim 19 wherein the means for securing includes an adjustable member.

21. A pressure transducer as set forth in claim 20 wherein the axes of the optical fibers are substantially parallel.

22. A pressure transducer as set forth in claim 21 wherein both reflectors are disposed at substantially 45 degree angles to a surface perpendicular to the axes of said optical fibers.

23. A pressure transducer as set forth in claim 22 wherein the locus of optical intersection of both reflectors is substantially at a midpoint between the input and output optical fibers.

24. A pressure transducer comprising:
a body;
an input optical fiber disposed in said body;
a light source for generating input light to said input optical fiber;
an output optical fiber disposed in said body;
a force responsive diaphragm, secured to said body, which deflects in response to sensed pressure;
a pair of reflectors disposed in the optical path between the input and output optical fibers for reflecting at least a portion of input light from the input optical fiber to the output optical fiber, the amount of light reflected depends upon the deflection of the diaphragm; and
means for monitoring and controlling the light source such that the amount of light generated by said light source remains constant.

25. A pressure transducer as set forth in claim 24 wherein the pair of reflectors includes a fixed reflector, secured to the body, and a moveable reflector, secured to the diaphragm, for movement with the diaphragm.

26. A pressure transducer as set forth in claim 25 further including a first optical detector disposed substantially in line with the output optical fiber for detecting the amount of light outputted from said output optical fiber.

27. A pressure transducer as set forth in claim 26 wherein the means for monitoring and controlling includes a feedback arrangement.

28. A pressure transducer as set forth in claim 27 wherein the means for monitoring and controlling includes a second optical detector disposed at an angle to the input optical fiber for detecting a predetermined portion of the input light.

29. A pressure transducer as set forth in claim 28 wherein the predetermined portion of input light is reflected off of an end of the input optical fiber adjacent to the light source.

30. A pressure transducer as set forth in claim 29 wherein the means for monitoring and controlling further includes a variable power source operably connected to said second optical detector and said light source in said feedback arrangement for applying a level of power to said light source dependent upon the light level detected by said second optical detector.

31. A pressure transducer as set forth in claim 30 wherein the light source includes a LED.

32. A pressure transducer as set forth in claim 31 wherein the moveable reflector has a reflecting surface in line with the axis of the input optical fiber.

33. A pressure transducer as set forth in claim 32 wherein the axes of the optical fibers are substantially parallel.

34. A pressure transducer as set forth in claim 33 wherein both reflectors are disposed at substantially 45 degree angles to a surface perpendicular to the axes of said optical fibers.

35. A pressure transducer as set forth in claim 34 wherein the locus of optical intersection of both reflectors is substantially at a midpoint between the input and output optical fibers.

36. A pressure transducer as set forth in claim 35 wherein the fixed and moveable reflectors have reflecting surfaces disposed at a substantially 90 degree angle relative to one another.

37. A pressure transducer as set forth in claim 1 wherein said fixed and moveable reflectors being positioned so as to form a U-shaped path from the input optical fiber through the set of reflectors into the output optical fiber.

38. A pressure transducer as set forth in claim 11 wherein said fixed and moveable reflectors being positioned so as to form a U-shaped path from the input optical fiber through the set of reflectors into the output optical fiber.

39. A pressure transducer as set forth in claim 11 wherein, the moveable reflector is adjustable with respect to the diaphragm.

40. A pressure transducer as set forth in claim 24 wherein said fixed and moveable reflectors being positioned so as to form a U-shaped path from the input optical fiber through the set of reflectors into the output optical fiber.

41. A pressure transducer as set forth in claim 24 wherein, the moveable reflector is adjustable with respect to the diaphragm.

42. A pressure transducer comprising:
a body;
an input optical fiber, disposed within the body;
a light source for generating input light to said input optical fiber;
an output optical fiber, disposed within the body;
a force responsive diaphragm, secured to the body, which deflects in response to sensed pressure;
a moveable reflector, coupled to the diaphragm;
a fixed position reflector, secured to the body;
wherein, said fixed and moveable reflectors being positioned so as to form a U-shaped path from the input optical fiber through the set of reflectors into the output optical fiber; and
means for monitoring and controlling the light source such that the amount of light generated by said light source remains constant.

43. A pressure transducer comprising:
a body;
an input optical fiber, disposed within the body and having a lengthwise axis;
a light source for generating input light to said input optical fiber;
an output optical fiber, disposed within the body and having a lengthwise axis;
a force responsive diaphragm, secured to the body, which deflects in response to sensed pressure;
a moveable reflector, coupled to the diaphragm;
a fixed position reflector secured to the body;
wherein, both reflectors are disposed at substantially 45 degree angles to a surface perpendicular to the axes of said optical fibers; and
means for monitoring and controlling the light source such that the amount of light generated by said light source remains constant.

44. A pressure transducer comprising:
a body;
an input optical fiber, disposed within the body;
a light source for generating input light to said input optical fiber;
an output optical fiber, disposed within the body;
a force responsive diaphragm, secured to the body, which deflects in response to sensed pressure;
a moveable reflector, coupled to the diaphragm;
a fixed position reflector secured to the body;
wherein, the fixed and moveable reflectors have reflecting surfaces disposed at a substantially 90 degree angle relative to one another;
means for monitoring and controlling the light source such that the amount of light generated by said light source remains constant.

45. A pressure transducer comprising:
a body;
an input optical fiber, disposed within the body, having a lengthwise axis;
a light source for generating input light to said input optical fiber;
an output optical fiber, disposed within the body and having a lengthwise axis;
wherein the axes of the optical fibers are substantially parallel;
a force responsive diaphragm, secured to the body, which deflects in response to sensed pressure;
a moveable reflector, coupled to the diaphragm;
a fixed position reflector secured to the body; and
means for monitoring and controlling the light source such that the amount of light generated by said light source remains constant.

46. A pressure transducer comprising:
a body;
an input optical fiber, disposed within the body;
a light source for generating input light to said input optical fiber;

an output optical fiber, disposed within the body;
a force responsive diaphragm, secured to the body, which deflects in response to sensed pressure;
a moveable reflector, coupled to the diaphragm;
a fixed position reflector, secured to the body;
  wherein, the movable reflector is adjustable with respect to the diaphragm; and
  means for monitoring and controlling the light source such that the amount of light generated by said light source remains constant.

47. A pressure transducer comprising:
a body,
an input optical fiber, coupled to the body;
wherein said input optical fiber is bifurcated to provide a separate input optical fiber;
an output optical fiber, coupled to the body;
a force responsive diaphragm, secured to the body, which deflects in response to sensed pressure; a
  means for securing the diaphragm to the body
  a fixed position reflector secured to the body,
  a moveable reflector, secured to the diaphragm;
means for monitoring and controlling the light source such that the amount of light generated by said light source remains constant.

48. A pressure transducer comprising:
a body;
an input optical fiber, coupled to the body;
an output optical fiber, coupled to the body;
a force responsive diaphragm, secured to the body, which deflects in response to sensed pressure;
an optical sensing space between said body and said diaphragm;
the sensing space including therein, a moveable reflector attached to the diaphragm, a fixed position reflector secured to the body, and a light path; wherein the light path between said reflectors is substantially parallel to a plane of a base of the diaphragm; and means for monitoring and controlling the light source.

49. A pressure transducer as set forth in any one of claims 42-48 and wherein a locus of optical intersection of both reflectors is substantially at a midpoint between the input and output optical fibers.

50. A pressure transducer as set forth in any one of claims 42-48 further including a light source disposed substantially in line with an axis of the input optical fiber for establishing an optical signal to the input optical fiber.

51. A pressure transducer as set forth in any one of claims 42-48 further including a first optical detector disposed substantially in line with an axis of the output optical fiber for detecting an optical signal outputted from said output optical fiber.

52. A pressure transducer as set forth in any one of claims 42-48 wherein movement of the diaphragm is primarily only in a direction substantially aligned with an optical axis of at least one of the optical fibers so as to couple different proportional amounts of reflected light.

53. A pressure transducer as set forth in any one of claims 42-48 wherein the movable reflector has a reflecting surface in line with an axis of the input optical fiber.

54. A pressure transducer as set forth in claims 42-48 wherein said fixed and movable reflectors disposed on one side of a midpoint of the diaphragm.

55. A pressure transducer as set forth in claim 42-47 comprising a light path wherein the light path between said moveable reflectors is substantially parallel to a plane of a base of the diaphragm.

56. A pressure as set forth in claims 37, 38, 40 and 42 wherein a portion of the U-shaped optical path the fixed and moveable reflectors substantially is orthogonal to axes of the optical fibers.

* * * * *